United States Patent Office 2,943,066
Patented June 28, 1960

2,943,066

OLEFIN POLYMERIZATION CATALYST

Herrick Ransom Arnold, Wilmington, and Robert Everett Foster, Hockessin, Del., assignors to E. I. du Pont de Nemours and Company, Wilmington, Del., a corporation of Delaware No Drawing. Filed May 8, 1956, Ser. No. 583,378

7 Claims. (Cl. 252—463)

This invention relates to a novel polymerization catalyst, and more particularly to an improved process for the polymerization of olefins, especially ethylene.

The use of unsupported and supported catalysts to polymerize ethylene to solid polymers is well known in the art. Particularly, the use of reduced metal oxides of group VIb of the periodic table of elements supported on inert carriers has been found to cause polymerization of ethylene to solid polymers. However, heretofore it was believed that such activity was characteristic of reduced metal oxides of group VIb of the periodic table of elements, particularly molybdenum- and tungsten-oxygen compounds containing the metal in subhexavalent states.

It is an object of the present invention to provide novel catalysts for the polymerization of olefins, and particularly for the polymerization of ethylene to high molecular weight polymers. It is a further object to provide an improved process for the polymerization of ethylene. Another object involves the preparation of the catalyst. Further objects will become apparent hereinafter.

In accordance with the present invention, highly useful polymerization catalysts are obtained when metal oxides, wherein the metal is selected from group IVb of the periodic table of elements, are extended on alumina, said group IVb metal oxides being the sole transition elements present, and thereafter treated with hydrogen at temperatures exceeding 500° C. In its preferred embodiments, this invention comprises the use of such hydrogen-treated group IVb metal oxides-on-active alumina as catalysts for the polymerization of ethylene to tough polyethylenes.

The preferred method for preparing the catalysts of the present invention, which gives rise to catalysts of exceedingly high rates and yields when employed in the polymerization of ethylene, is through impregnation of alumina with solutions of group IVb metal alkoxides in organic solvents followed by hydrolysis and treatment with hydrogen at temperatures above 500° C. In this method, active alumina pellets are impregnated with an organic solvent solution of a group IVb metal alkoxide; e.g., titanium(IV) isopropoxide, and the impregnated pellets are then allowed to dry. The titanium(IV) alkoxide is then hydrolyzed to form the hydrous titanium oxide on the alumina support. The hydrous titanium oxide-on-alumina is then placed in a heat-resistant glass tube mounted within an electric furnace, and hydrogen alone, or hydrogen admixed with an inert diluent gas, such as helium or argon, is passed over the charge at atmospheric pressure and a space velocity in the neighborhood of 500–1500 hrs.$^{-1}$, while the temperature is raised to between 500° C. and 1000° C. at the rate of 100° C. to 200° C. per hour. The treatment with hydrogen is continued under these conditions for from 4 to 40 hours. Thereafter the charge is permitted to cool to room temperature in a non-oxidizing atmosphere, the hydrogen-treated titania-on-alumina composition is transferred under an inert atmosphere to a storage receptacle and stored under an inert atmosphere. Various other methods of extending the group IVb metal oxides on the alumina may be employed. To obtain the catalytic activity made use of in the present invention, it is essential only that the alumina-group IVb metal oxide composition be subjected to the hydrogen treatment described herein. However, the degree of catalytic activity may vary with the method by which the composition is obtained.

The composition of the hydrogen-treated group IVb metal oxide-on-alumina is not definitely known. It is, however, essential that both components, the alumina and the group IVb metal oxide be present to obtain the catalytic activity, and possibly the interaction of these two components gives rise to the catalytic activity. The compositions are characterized by showing paramagnetic resonance.

The alumina component may be a commercial preparation, or it may be made in any known manner. Thus, the alumina may be made by dehydrating hydrous alumina as described in Ind. Eng. Chem. 42, 1398 (1950), U.S. 2,453,327 issued to G. T. Layng and F. T. Suman on November 9, 1948, and H. D. Weiser's "Colloid Chemistry," John Wiley & Sons, Inc., New York (1949), 2nd ed., or by gel precipitation from salt solutions as disclosed in U.S. Patent 2,432,286 issued to William H. Claussen and Homer B. Wellman on December 9, 1947, or from metallic aluminum as disclosed in U.S. Patent 2,274,634 issued to Llewellyn Heard on March 3, 1942.

The hydrogen-treated group IVb metal oxide-on-alumina compositions are effective catalysts for polymerizing ethylene to essentially all high molecular weight polyethylenes. In such use the hydrogen-treated group IVb metal oxide-on-alumina can be employed in the form of pellets of spherical, cylindrical or other shapes. If desired, however, it can also be used in finely divided form.

In a convenient and practical method of operation, a 400-cc. reactor is charged with catalyst and an organic reaction medium, e.g., cyclohexane or xylene, in sufficient amount to occupy about one-fourth of the reactor volume. The charged reactor is swept with oxygen-free nitrogen, cooled to about −35° C., evacuated, and then pressured with ethylene. The charged reactor is placed in a reciprocating rack equipped with heating means, and heating and agitation are started. When the temperature has reached the level selected for operation, the pressure is adjusted to the desired level by admitting ethylene under pressure. The reaction is permitted to proceed for at least one hour, during which time the pressure is maintained by periodic injections of ethylene. Usually the reactor is filled with polymer after 8–12 hours operation. Thereafter the reactor is allowed to cool, opened and the contents removed. The reaction product is a very tough white solid containing embedded catalyst. If desired, the catalyst can be removed from the polymer by fractional extraction with an organic solvent, such as xylene, and filtering. The polymer is recovered from the filtrate by pouring it into a large excess of a non-solvent such as methanol. The precipitated polymer is dried at room temperature and is a tough, white solid. Alternatively, aqueous acid or base can be used to extract the catalyst and this method is particularly useful when the polymer is of very high molecular weight. Operation in a flow system with a fixed bed of catalyst simplifies this problem in that the polymer can be recovered directly from the effluent solvent in pure, catalyst-free, form.

The examples which follow are submitted to illustrate and not to limit this invention. Unless otherwise stated, inherent viscosity refers to measurements made at 0.1% concentration in tetrahydronaphthalene at 125° C.

Example I

Tetraisopropyltitanate was adsorbed on an 8-mesh activated $Al_2O_3$ (a commercial product having a surface area of 350 m.$^2$/g.) dried at 450° C. from a 5% solution in benzene. After standing one day, the solid was collected by filtration, washed with benzene, dried at 100° C. in a vacuum oven, and added to distilled water. After standing one day, the solid was collected by filtration, washed with water, and dried at 450° C. Analysis: Ti, 2.73, 2.74.

The above (103 g.) was treated with hydrogen containing less than 5 p.p.m. $O_2$ at a space velocity of 1000 hr.$^{-1}$ for 18 hours at 750° C. The product was white with a barely perceptible blue cast and weighed 100 g. Analysis: Ti, 3.09, 3.02; surface area, 201 m.$^2$/g.

Example II

A stainless steel reactor was charged with 8.7 g. of the product of Example I and 90 g. of dry cyclohexane under an atmosphere of nitrogen. Ethylene was pressured in to give 300 lb./sq. in. and heat applied. At 120° C. the pressure was increased to 1000 lb./sq. in. When the temperature reached 175° C., the pressure began to drop. The polymerization was so rapid that the temperature flashed to 204° C. After 8 hours at 170° C., the reaction mixture was cooled, the polymer was removed and dried at 100° C. in a vacuum oven. The hard plug of polymer with the catalyst contained therein weighed 200 g. This polymer (crude) was pressed into a tough film at 174° C. under 19,000 lb./sq. in. pressure.

Example III

Example I was repeated. The product obtained contained 1.92% Ti. This material when employed in quantities of 6.0 g. brought about the polymerization of ethylene at 135° C. and 2000 lb./sq. in. pressure to form 239 g. of hard, high molecular weight polymer in 12 hours.

Example IV

A parallel experiment to Example III, employing a reduced titania-on-alumina weighing 6.0 g. and containing 1.36% Ti, generated 69 g. of solid polyethylene at 160° to 170° C. and 1600 lb./sq. in. pressure in 12 hours.

A catalyst weighing 7.3 g. and containing 0.82% Ti formed 2.0 g. of polymer; 7.9 g. of catalyst containing 0.48% Ti formed 12.1 g. of polymer, and 7.0 g. of catalyst containing 0.35% Ti formed 10.7 g. of polymer in 12 hours under similar conditions.

Example V

Titania-on-alumina weighing 6.7 g., prepared according to Example I, was treated with hydrogen at 550° C. and a space velocity of 1000 hrs.$^{-1}$ for 18 hours. The resultant product brought about formation of 158 g. of high molecular weight polyethylene at 145° to 150° C. and 1200 lb./sq. in. pressure in 12 hours.

Example VI

Titania on 50/50 silica-alumina, prepared in a fashion similar to Example I, promoted the formation of 61 g. of polyethylene at 225° C. and 2500 lb./sq. in. pressure in 12 hours, when 7.2 g. of the catalyst was employed.

Titania on 90/10 commercial silica-alumina treated with hydrogen as described in Example I promoted the polymerization of ethylene. Thus, in 12 hours at 225° C. and 2500 lb./sq. in. pressure, there was obtained 14 g. of polymer using 7.0 g. of the catalyst.

Example VII

To a solution of 35 g. of butyl zirconate (14.83% $ZrO_2$) in 60 ml. of cyclohexane, there was added 110 g. of 8-mesh activated commercial alumina. After standing two days, the mixture was filtered and the solid washed with benzene and added to 1 liter of distilled water. After four days, the solid was removed by filtration and dried at 500° C. for 20 hours. Analysis: Zr, 1.93%.

In a high silica, heat-resistant glass tube, 55.6 g. of the zirconia-on-alumina, prepared as above, was treated with hydrogen containing less than 5 p.p.m. oxygen at 750° C. for 18 hours at a space velocity of 1000 hr.$^{-1}$. The product weighed 54.0 g. and was white in color.

Example VIII

Example II was repeated employing 9.3 g. of the product of Example VII. Polymerization occurred at 120° C. under 1000 lb./sq. in. in 19 hours. The total weight of dried polymer and catalyst amounted to 111 g. and was a hard solid. The crude polymer was so high-melting that it had to be heated to 300° C. under 1900 lb./sq. in. before it could be pressed into a film. The resulting film was very tough.

Example IX

Eighty-two grams (100 ml.) of 8 to 14 mesh commercial titania-on-alumina was treated with hydrogen at a space velocity of 1000 hr.$^{-1}$. The temperature was raised from room temperature to 400° C. in 6.5 hours, maintained at 400° C. for 16 hours, raised to 600° C. over a 2-hour period, and held at that temperature for 16 hours. The temperature was increased over a period of 2 hours to 800° C., where it was held for 6 hours, and then cooled overnight in hydrogen. The weight of the blue-white product was 78 g., which represents a loss of 4.9% in weight during the treatment.

Example X

A mixture of 80 g. of xylene and 6.3 g. of the hydrogen-treated titania-on-alumina of Example IX was heated in a pressure vessel at 100–225° C. under a pressure of 2500 lb./sq. in. of ethylene for 12 hours. The solid polymer was extremely high molecular weight, as evidenced by its partial extraction with boiling xylene over a period of 60 hours to give a soluble material having an inherent viscosity of 9.6–10.5.

Example XI

To 172.6 g. of cooled, stirred, titanium tetra chloride, there was added very slowly 125 g. of ice-cold water. The yellow precipitate which formed initially redissolved when about half the water had been added, resulting in a slightly cloudy yellow viscous solution. The remainder of the water was then added more rapidly. To the stirred solution, there was added 72.71 g. of hydrous alumina (Alcoa H–41, No. 2200) at room temperature. Stirring was continued for 1.5 hours, the slurry was allowed to stand for two days, filtered, and the thick mass evaporated to dryness on a steam bath. The hard, white cake was crushed and screened to 8–20 mesh. The resultant granules were calcined at 400° C. for 18 hours to generate the anhydrous oxides. The yield, after baking, was 52.6 g. Fines amounted to an additional 55.8 g.

The granular titania-on-alumina (47.6 g.) was treated with deoxidized hydrogen at a space velocity of 500 hr.$^{-1}$ in a 2-inch diameter high silica, heat-resistant glass tube placed in a split type heating furnace inclined about 10° from the horizontal. The temperature was increased from room temperature gradually, over a period of 5.5 hours to 600° C., maintained at 600° C. for 16 hours and then increased to 800° C., where it was held for 24 hours. The light blue product was cooled and transferred to small vials under an inert atmosphere. The loss in weight on hydrogen-treatment was 2.2 g. Analysis of the product showed 18.6% Ti and 33.0% Al, corresponding to 31% $TiO_2$ on $Al_2O_3$; the surface area was 144.3 square meters per gram.

Example XII

A mixture of 80 g. of cyclohexane, 6.7 g. of the hydrogen-treated titania-on-alumina of Example XI and ethylene was agitated and heated at 225° C. and 2660 lb./sq.

in. pressure for 13 hours. The crude solid, containing the catalyst charged, weighed 20 g., of which about 7.6 g. was polyethylene. The crude polymer was extracted with boiling xylene, and the extract poured into methanol to precipitate the purified polymer. The polymer was of such high molecular weight it could not be completely dissolved for viscosity measurement; it could, however, be pressed into a clear film at 190° C. and 19,000 lb./sq. in. pressure which had the following properties. Stiffness, 100,865–106,468 lb./sq. in.; elongation, 772% at 2854 lb./sq. in.

*Example XIII*

Into a 400 ml. stainless steel-lined pressure vessel was charged 4.69 g. of the catalyst, prepared as in Example I, 100 ml. cyclohexane, 42 g. propylene and 28 g. ethylene. The vessel was then heated under autogenous pressure for 8 hours at 125° C. with continuous agitation. The cooled contents after reaction were concentrated under reduced pressure to yield 16.6 g. total solids. A 10.0 g. portion of the above solid was refluxed with 750 ml. benzene for 16 hours. The solution was decanted and the polymer precipitated to yield 0.95 g. (13.2% of the polymer) of solid. The infrared spectrum of a film pressed from the soluble portion indicated 11.5% propylene.

The inclusion of a liquid medium in the reaction zone in contact with the catalyst produces a desirable effect in facilitating temperature control and bringing about better contact between the ethylene and catalyst. Various classes of individual hydrocarbons or mixtures of hydrocarbons which are liquid and substantially inert under polymerization conditions can be employed. Examples of such hydrocarbons are benzene, toluene, xylene, xylene-p-cymene mixtures, cyclohexane, tetrahydro- and decahydronaphthalenes, t-butylbenzene, ethylxylenes, etc.

The use of a reaction medium is not essential. Usually, however, a reaction medium is used because it aids in the dissipation of the heat of reaction, makes it easier to control the reaction, and serves as a solvent for the polymer, particularly in continuous flow operation. In a batch process, the amount of liquid reaction medium generally occupies about one-fourth of the reactor volume. In continuous operation, however, the liquid reaction medium may be present in amount which may range from about 10 to about 1000% by weight of the ethylene being processed.

Although in the preferred practice a liquid reaction medium is used, the polymerization may be effected in the gaseous phase in the absence of the reaction medium. In this case the catalyst may be employed in the form of fluidized particles, as a fixed bed, or as a countercurrent or co-current bed of particles. A moving bed or slurry of catalyst in the liquid hydrocarbon medium can be used and allowed to flow downwardly through a tower, and ethylene alone or ethylene dissolved in a suitable hydrocarbon medium can be injected into the lower portion of the tower or at various elevations within the tower. Slurry of catalyst and polymer is withdrawn and unconverted ethylene recycled into the reaction zone.

In the examples, the catalyst has been made by hydrolyzing a group IV*b* metal alkoxide directly on the alumina support. It is to be understood, however, that any method which brings about intimate association with the alumina support may be used. Thus, instead of depositing the group IV*b* metal oxide on the alumina from organic solvent solution, it may be deposited from aqueous solution.

In depositing the group IV*b* metal oxide on the alumina there may be used any salt of a group IV*b* metal with an inorganic or organic acid which is hydrolyzable to the hydrous oxide. Examples are the chlorides, nitrates, sulfates, acetates, propionates, etc. However, the alkoxides are greatly preferred.

In place of the isobutyl esters, there can be used other group IV*b* metal alkoxides, such as titanium(IV) heptoxide, hafnium(IV) ethoxide, hafnium(IV) decyloxide, thorium(IV) hexoxide, thorium(IV) dodecyloxide, zirconium isopropoxide, etc.

The group IV*b* metals are titanium, zirconium, hafnium, and thorium.

In practice, the group IV*b* metal alkoxide or salt is dissolved in a volatile solvent to produce a solution containing from 5 to 10% solids and this solution is used to impregnate the alumina support. The hydrous group IV*b* metal oxide is formed directly on the support. The amount of hydrous titanium oxide deposited on the support in this way will vary from 0.1 to 25%. The relative proportions of the alumina to the metal oxide is not critical, as indicated by the examples. In general, it is preferred to use an excess of the alumina.

Alternatively, the group IV*b* metal alkoxide may be deposited on the support by absorption or direct contact of liquid ester with the support.

As further shown by the examples, an inert third component may be added such as silica, but no particular advantage is gained thereby. Alumina, however, may not be completely replaced and is necessary to the formation of the catalyst.

The particular pressure at which the polymerization is effected depends upon such interdependent factors as temperature and activity of the catalyst. As a rule, it is not necessary to use pressures above 1000 atmospheres to obtain good conversions of the ethylene at reasonable rates. Most generally, the pressure will be between atmospheric and 200 atmospheres.

The temperature at which the polymerization is effected can be varied over wide limits. Thus, it may vary from that of the room to 350° C. With active catalysts and pressures of 10 to 100 atmospheres the temperature will be between 80° and 250° C.

The amount of catalyst is not a critical factor. Operating batchwise in a 400-cc. reactor, an amount is used which is between 2 and 20 grams.

Under the preferred conditions of temperature and pressure in a batch process employing from 2 to 20 grams of catalyst in a 400-cc. reactor, the time of reaction will be between 1 and 20 hours. If desired, however, this time may be lengthened or shortened by varying conditions of operation.

The catalysts used in the process of this invention have particular value for polymerizing ethylene to solid high molecular weight polyethylenes. The catalysts may be further employed in the polymerization of propylene and homologs of ethylene and propylene.

The process of this invention employs mild conditions and converts ethylene to solid, tough polymers in high yield.

We claim:

1. A catalyst composition useful in the polymerization of ethylenically unsaturated hydrocarbons consisting essentially of the product formed by extending on alumina a metal oxide wherein the said metal is an element of group IV*b* of the periodic table, and thereafter contacting said metal oxide extended on alumina with hydrogen at a temperature of 500° to 1000° C.

2. A catalyst composition useful in the polymerization of ethylenically unsaturated hydrocarbons consisting essentially of the product formed by extending on alumina a titanium oxide, and thereafter contacting said titanium oxide extended on alumina with hydrogen at a temperature of 500° to 1000° C.

3. A catalyst composition useful in the polymerization of ethylenically unsaturated hydrocarbons consisting essentially of the product formed by extending on alumina a zirconium oxide, and thereafter contacting said zirconium oxide extended on alumina with hydrogen at a temperature of 500° to 1000° C.

4. The process of preparing a catalyst for use in the polymerization of olefins consisting essentially of impregnating alumina with a metal alkoxide wherein the said metal is an element of group IV*b* of the periodic table, hydrolyzing said metal alkoxide on alumina and contacting the resultant metal oxide on alumina with hydrogen at a temperature of 500° to 1000° C.

5. The process as set forth in claim 4 wherein the metal alkoxide is titanium alkoxide.

6. The process as set forth in claim 4 wherein the metal alkoxide is zirconium alkoxide.

7. The product prepared by the process of claim 4.

References Cited in the file of this patent

UNITED STATES PATENTS

| | | |
|---|---|---|
| 2,273,338 | Thomas | Feb. 17, 1942 |
| 2,331,292 | Archibald | Oct. 12, 1943 |
| 2,354,892 | Thacker | Aug. 1, 1944 |
| 2,436,256 | Hanford | Feb. 17, 1948 |
| 2,605,238 | Kranty | July 29, 1952 |
| 2,694,049 | Reynolds | Nov. 9, 1954 |